UNITED STATES PATENT OFFICE.

FRED M. BORCHERT, OF CHICAGO, ILLINOIS.

FOOD COMPOSITION.

1,023,919.      Specification of Letters Patent.    Patented Apr. 23, 1912.

No Drawing.     Application filed November 23, 1910.   Serial No. 593,856.

*To all whom it may concern:*

Be it known that I, FRED M. BORCHERT, a subject of the Emperor of Germany, residing at Chicago, county of Cook, and State of Illinois, have invented a new and useful Food Composition, of which the following is a specification.

My composition is designed for use in preparing a drink or beverage in the manner stated below, and consists in general terms, of a mixture of cocoa and one or more cereals, the cocoa comprising approximately 50% by weight of the mixture. The cereals which I have selected for this purpose are corn, oats, rice and wheat, and the proportions in which I have combined them with the cocoa are as follows, viz:

| | |
|---|---|
| Cocoa | 16 ounces |
| Corn | 4 " |
| Oats | 5 " |
| Rice | 5 " |
| Wheat | 2 " |

The ingredients above named may be combined in the proportions stated, the corn, oats, rice and wheat having been first ground or pulverized, to form a non-perishable composition which may be kept on hand for immediate use, whenever desired, in the preparation of an improved drink or beverage, which is preferably made as follows: Two teaspoonsful of the combined ingredients above described are placed in one pint of cold milk or cold water, which is then stirred until the ingredients are evenly distributed throughout the liquid. The mass is then slowly heated until it is brought to the boiling point. The preparation is then complete.

When the beverage is prepared with water instead of milk any preferred amount of milk may be added afterward, and sugar may also be added as desired.

The beverage made as above described has the advantage over the ordinary cocoa or chocolate beverage in that it is much cheaper to prepare, is more nutritious and more palatable; and also in that by reason of the smaller amount of cocoa being used in its preparation it has less of the harmful effect which is known to be due to the use of cocoa or chocolate as a food. For the same reasons, especially the last mentioned, it is also an improvement over coffee.

I claim as my invention.

1. The herein described composition for making beverages consisting of cocoa and cereals pulverized and mixed in approximately equal proportions by weight.

2. The herein described composition for making beverages consisting of cocoa, corn, oats, rice, and wheat pulverized and mixed, said cocoa comprising approximately one-half part by weight of the composition.

3. The herein described composition for making beverages consisting of cocoa, 16 parts by weight; corn, 4 parts; oats, 5 parts; rice, 5 parts; wheat, 2 parts, all of said ingredients being pulverized and mixed together.

4. The herein described composition consisting of cocoa, corn, oats, rice and wheat pulverized and intimately mixed to form a non-perishable composition adapted for use in preparing a beverage.

In witness whereof I have hereunto affixed my name in the presence of two witnesses this fourteenth day of November 1910.

FRED M. BORCHERT.

Witnesses:
MINNIE V. WEIAND,
DORA E. FOSS.